(12) United States Patent
Wright et al.

(10) Patent No.: US 10,351,176 B2
(45) Date of Patent: Jul. 16, 2019

(54) VEHICLE BODY STRUCTURE FOR ABSORBING SIDE IMPACTS

(71) Applicant: Honda Motor Co., Ltd., Tokyo (JP)

(72) Inventors: Aaron B. Wright, Ostrander, OH (US); Christopher J. Mampe, Delaware, OH (US)

(73) Assignee: Honda Motor Co., Ltd., Tokyo, OH (US)

( * ) Notice: Subject to any disclaimer, the term of this patent is extended or adjusted under 35 U.S.C. 154(b) by 129 days.

(21) Appl. No.: 15/465,668

(22) Filed: Mar. 22, 2017

(65) Prior Publication Data

US 2018/0273099 A1  Sep. 27, 2018

(51) Int. Cl.
*B62D 21/15* (2006.01)
*B62D 21/20* (2006.01)
*B62D 25/20* (2006.01)
*B62D 29/00* (2006.01)

(52) U.S. Cl.
CPC .......... *B62D 21/157* (2013.01); *B62D 25/20* (2013.01); *B62D 29/007* (2013.01); *B60Y 2410/124* (2013.01); *B62D 25/2036* (2013.01)

(58) Field of Classification Search
CPC .................................................. B62D 21/157
USPC ....................................... 296/187.12, 193.02
See application file for complete search history.

(56) References Cited

U.S. PATENT DOCUMENTS

| 6,168,228 B1 | 1/2001 | Heinz et al. |
| 6,189,952 B1 * | 2/2001 | Schmidt ............... B62D 21/157 |
| | | 296/187.12 |
| 6,276,484 B1 | 8/2001 | Evans et al. |
| 6,540,286 B2 | 4/2003 | Takemoto et al. |
| 6,568,745 B2 * | 5/2003 | Kosuge ................ B62D 21/157 |
| | | 296/187.12 |
| 7,581,781 B2 | 9/2009 | Brunner et al. |
| 7,673,904 B2 | 3/2010 | Harada et al. |
| 7,992,927 B2 | 8/2011 | Kitai et al. |
| 8,079,635 B2 | 12/2011 | Devor et al. |
| 8,276,977 B2 | 10/2012 | Tanaka et al. |
| 8,998,305 B2 | 4/2015 | Obata et al. |
| 2001/0038231 A1 | 11/2001 | Takemoto et al. |
| 2002/0153749 A1 | 10/2002 | Lee |

FOREIGN PATENT DOCUMENTS

| CN | 101861266 | 10/2010 | |
| CN | 102438881 | 5/2012 | |
| DE | 19943296 A1 * | 3/2001 | ........... B62D 21/157 |
| EP | 1840006 | 10/2007 | |

\* cited by examiner

*Primary Examiner* — Jason S Daniels
(74) *Attorney, Agent, or Firm* — Rankin, Hill & Clark LLP

(57) ABSTRACT

A vehicle body structure for absorbing side impacts includes a pipe member extending laterally from a first lateral side of a vehicle frame to a second lateral side of the vehicle frame. The vehicle body structure also includes a lower stamped member or assembly and an upper stamped member. The lower stamped member or assembly is disposed on an underside of the pipe member and extends laterally from the first lateral side of the vehicle to the second lateral side of the vehicle. The upper side stamped member is disposed over the pipe member to sandwich the pipe member between the lower side and the upper side stamped members. The upper side stamped member extends laterally from the first lateral side of the vehicle frame to the second lateral side of the vehicle frame.

19 Claims, 4 Drawing Sheets

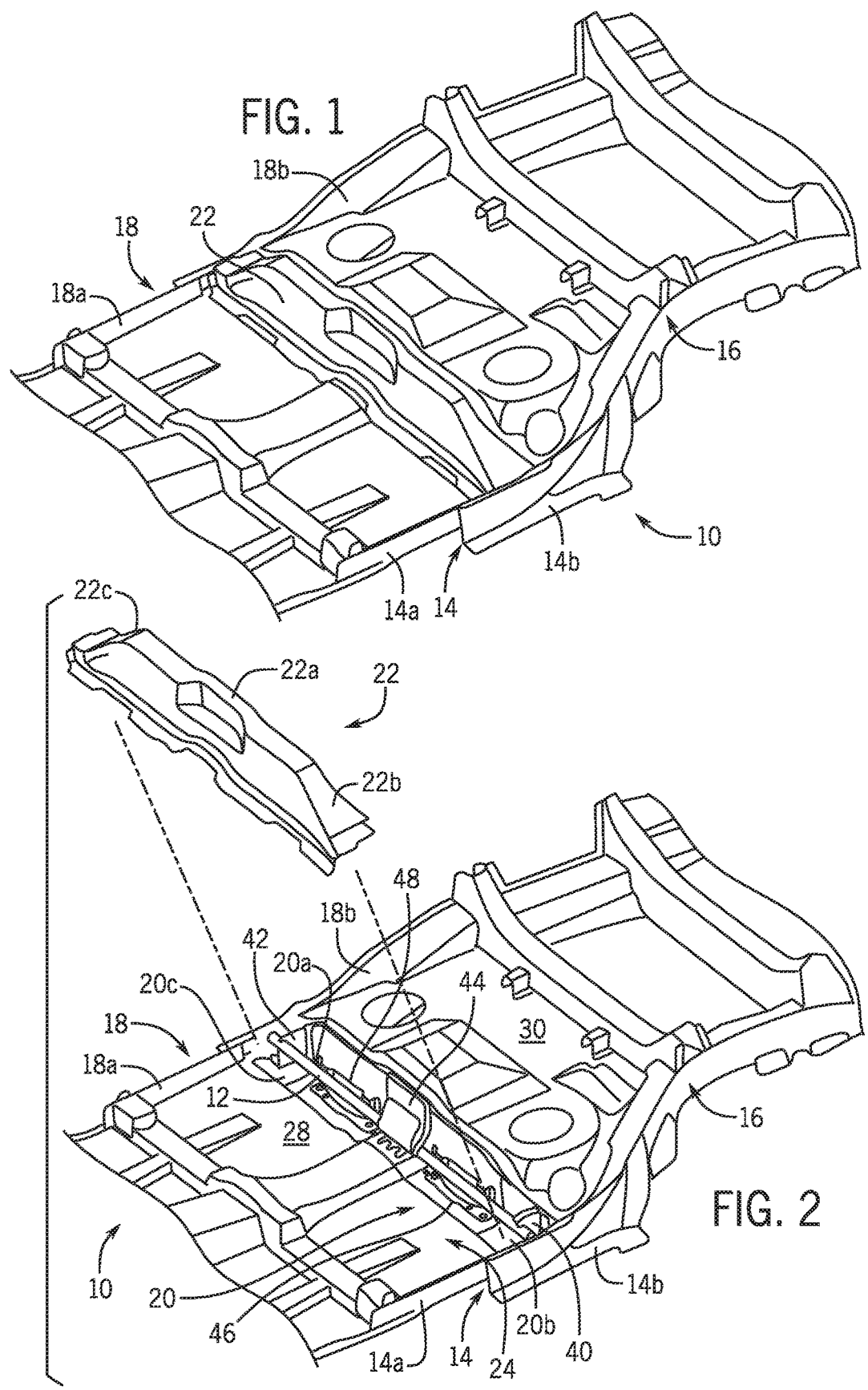

VEHICLE BODY STRUCTURE FOR ABSORBING SIDE IMPACTS

BACKGROUND

Structural body components of high volume mass production passenger vehicles are mostly comprised of sheet metal stampings. Other less common components include steel tubes, aluminum extrusions, steel castings, aluminum castings, magnesium castings, and reinforced plastic. Steel tubes are widely used inside doors to control intrusion as a result of impact loads from the side of a vehicle. The length of the tube used in the door typically is roughly perpendicular to the direction of the loading.

Light trucks and passenger cars must meet specific crash requirements set by NHTSA, IIHS, and additionally according to internal vehicle manufacturer standards. Side crash performance is a mode that is evaluated. During a side crash event, load is transferred from the impact location into the body structure. In a light truck, the impact location can be low as compared to a passenger car due to the increased right height for the light truck vehicle. The occupant position (i.e., relative to height of the vehicle) is determined typically by a packaging model, which sets the passenger hip location in the vehicle relative to major vehicle components.

With respect to side crash structure, the longitudinal load bearing structure (e.g., the doors, the side sills, the side panels, etc.) is the first to receive impact load. The heights of these structures are determined by many factors. The cross-car structure is then loaded by the longitudinal structure. The cross-car structure must engage the longitudinal structure while also considering the position of the occupant. A goal of the cross-car structure is to minimize intrusion into the occupant space.

SUMMARY

According to one aspect, a vehicle body structure for absorbing side impacts includes a pipe member extending laterally from a first lateral side of a vehicle frame to a second lateral side of the vehicle frame. The vehicle body structure also includes a lower stamped member or assembly and an upper stamped member. The lower stamped member or assembly is disposed on an underside of the pipe member and extends laterally from the first lateral side of the vehicle to the second lateral side of the vehicle. The upper side stamped member is disposed over the pipe member to sandwich the pipe member between the lower side and the upper side stamped members. The upper side stamped member extends laterally from the first lateral side of the vehicle frame to the second lateral side of the vehicle frame.

According to another aspect, a body structure for absorbing side impacts on a vehicle includes a first stamped member, a second stamped member and a bar member. The first stamped member extends across a lateral width of the vehicle. The second stamped member extends laterally across the lateral width of the vehicle. The second stamped member is fixedly secured to the first stamped member. The bar member extends across the lateral width of the vehicle. The bar member is interposed between the first and second stamped members so as to be enclosed by the first and second stamped members.

According to a further aspect, a vehicle body structure includes a pipe member extending laterally across a vehicle frame. The pipe member is interposed between a pair of stamped members that each extend laterally across the vehicle frame. The pipe member is MIG welded to the stamped members to axially load the pipe member for side impact collisions.

BRIEF DESCRIPTION OF THE DRAWINGS

FIG. 1 is a partial perspective view of a vehicle body structure for absorbing side impacts according to an exemplary embodiment.

FIG. 2 is a view similar to FIG. 1 but showing an upper side stamped member removed to reveal a pipe member and a lower side stamped member or assembly.

DETAILED DESCRIPTION

Figure 3:
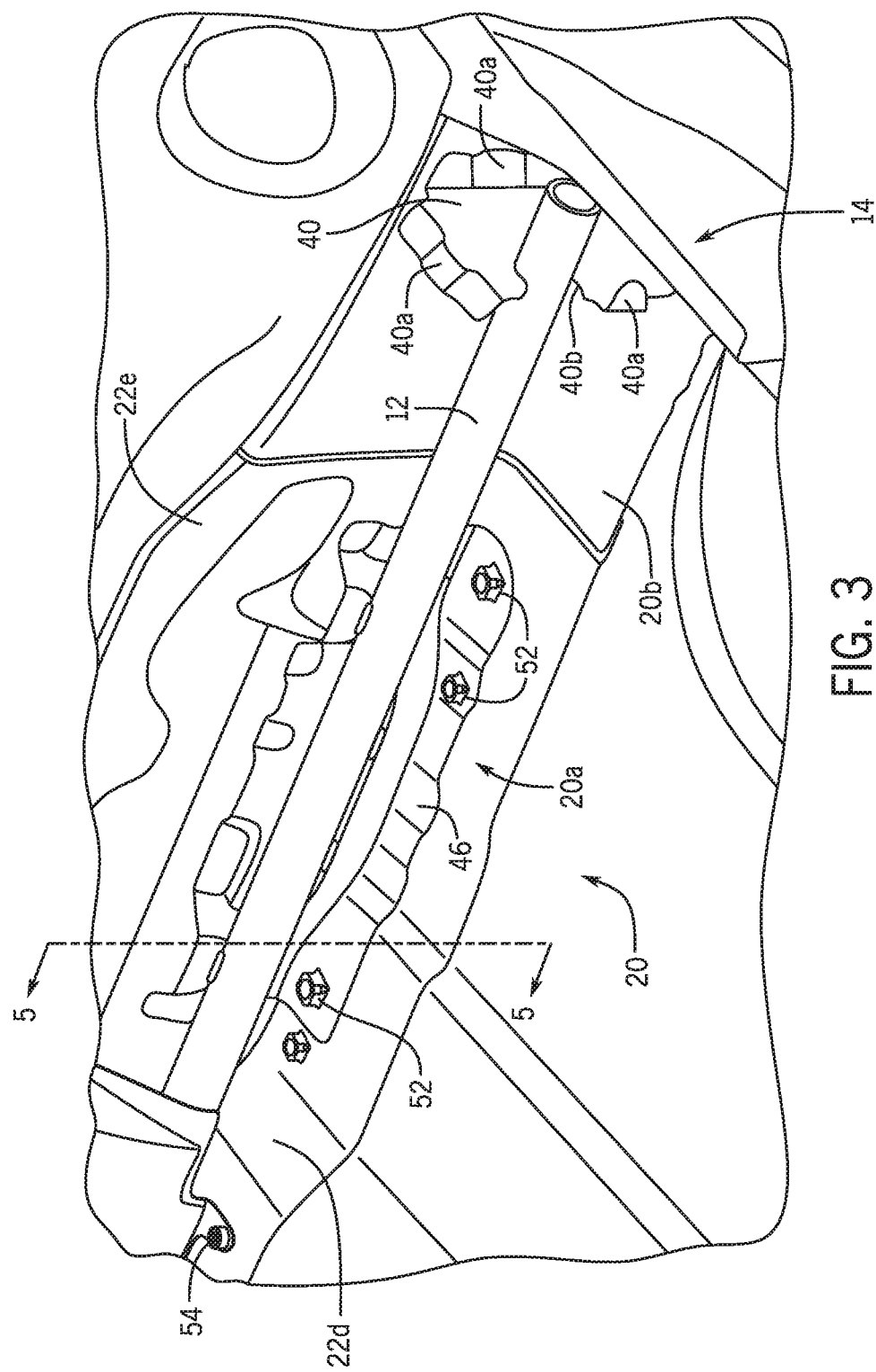
FIG. 3 is a partial enlarged perspective view showing the pipe member secured to one of a pair of bulkheads and to one of a pair of lateral stiffeners.
Figure 4:
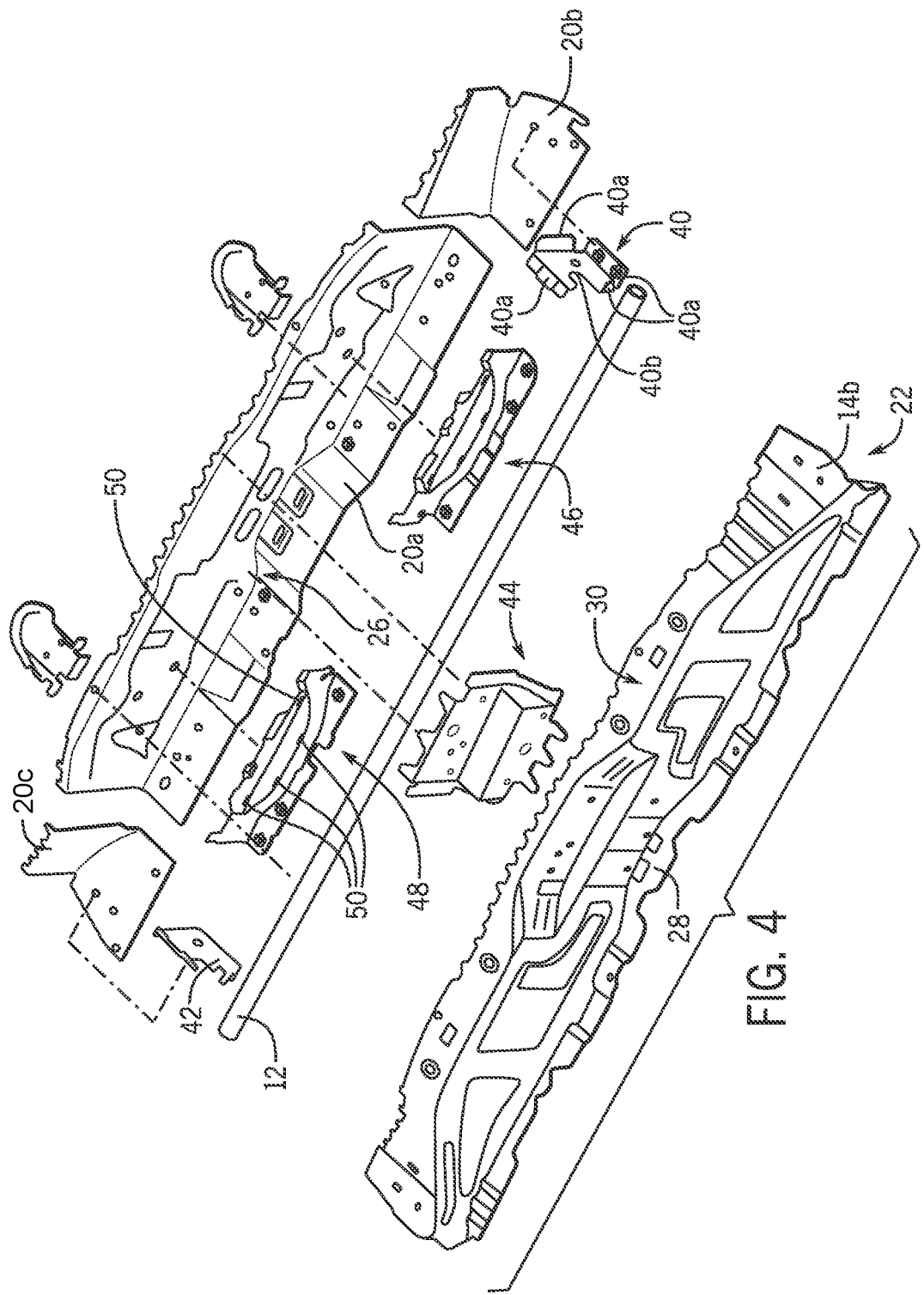
FIG. 4 is an exploded perspective view of the vehicle body structure.

With reference now to the figures wherein the illustrations are for purposes of illustrating one or more exemplary embodiments and not for purposes of limiting the same, FIG. 1 shows a vehicle body structure for absorbing side impacts generally identified by reference numeral 10. With additional reference to FIGS. 2-5, the vehicle body structure 10 includes a pipe member 12 extending across a lateral width of a vehicle laterally from a first lateral side 14 of a vehicle frame 16 to a second lateral side 18 of the vehicle frame 16. In one embodiment, the first lateral side 14 is the side defined by side sill components 14a, 14b of the vehicle frame 16 and the second lateral side 18 is formed by side sill components 18a, 18b of the vehicle frame 16. Generally, the lateral sides of the vehicle frame 16 can be defined by any one or more frame components (e.g., side sill components 14a, 14b, 18a, 18b) that define a lateral extent of the vehicle frame 16.

The vehicle body structure 10 further includes a lower stamped member or assembly 20 and an upper stamped member 22. The lower stamped member or assembly 20 is disposed on an underside of the pipe member 12 and extends across a width of the vehicle laterally from the first lateral side 14 of the vehicle frame 16 to the second lateral side 18 of the vehicle frame 16. The upper side stamped member 22 is disposed over the pipe member 12 to sandwich the pipe member 12 between the lower side and upper side stamped members 20, 22 so that the pipe member 12 is thereby enclosed by the first and second stamped members 20, 22. The upper side stamped member 22 extends across a width of the vehicle laterally from the first lateral side of the vehicle frame to the second lateral side of the vehicle frame 16. Advantages of applying the pipe member 12 inside the lower side and upper side stamped members 20, 22 is a reduction of weight and cost for the vehicle body assembly as compared to traditional stamped body construction having the same side impact crash characteristics.

In the illustrated embodiment, the lower stamped member or assembly 20 is an assembly having a central stamping 20a and two laterally flanking stampings 20b, 20c, which can also be referred to as stiffeners. The upper side stamped member 22 is shown as a single stamping in the illustrated embodiment. Also in the illustrated embodiment, the upper stamped member 22 has an arched or rainbow shaped structure with a central portion 22a thereof is elevated to lateral ends 22b, 22c thereof. The upper stamped member 22 can be secured to the lower stamped member 20 fixedly by one or both of welding or fastening (e.g., fasteners 56).

Of course, it is to be appreciated that the upper stamped member 22 could be formed by more than a single stamping (e.g., two or more stampings) and likewise the lower stamped member or assembly 20 could be formed by fewer than the illustrated three stampings 20a, 20b, 20c or by more than the illustrated three stampings 20a, 20b, 20c. Herein, reference to the lower stamped member 20 is intended to encompass when the member 20 is formed by a single stamped piece or by a plurality of stamped pieces.

Figure 5:
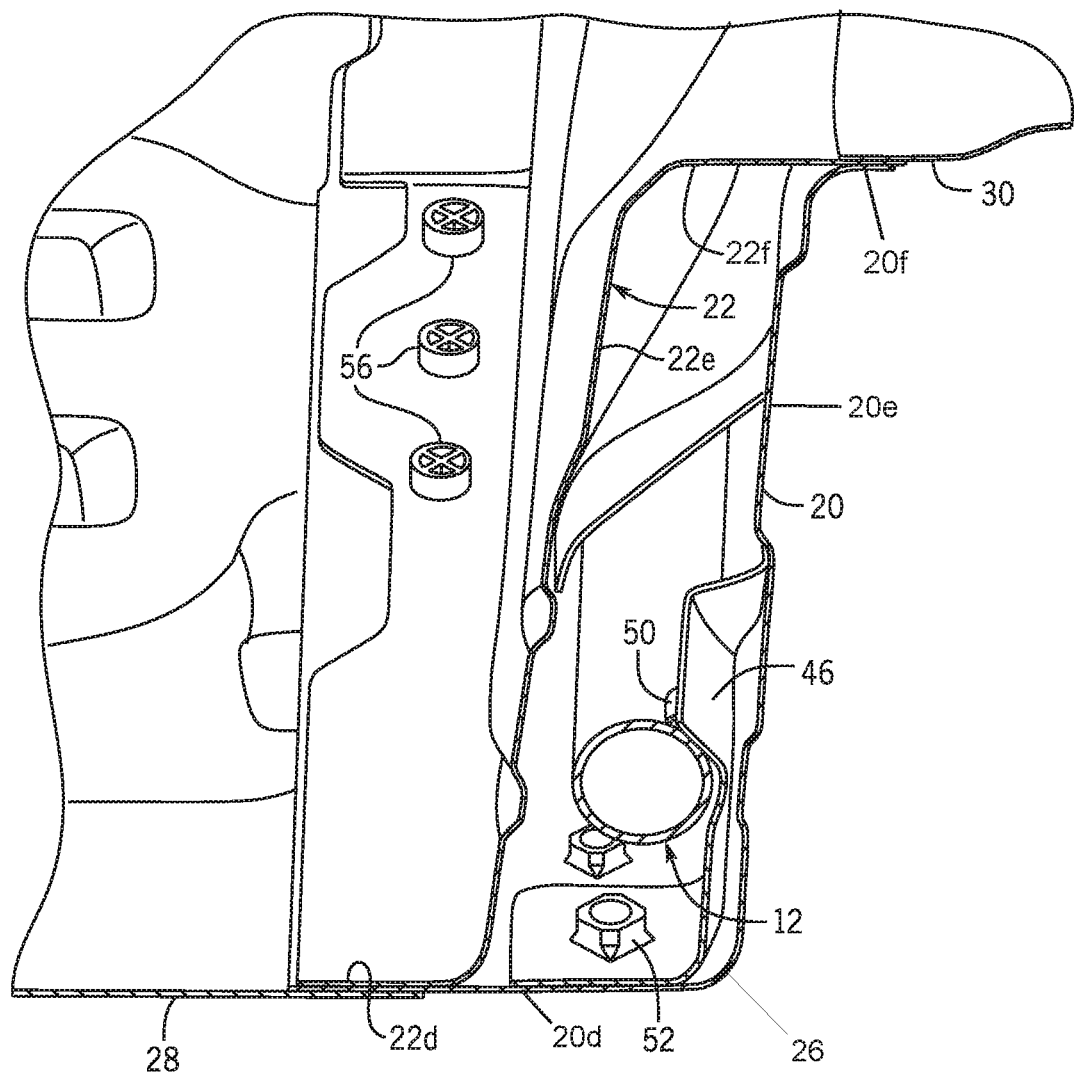
FIG. 5 is a cross-section view taken along the lined 5-5 of FIG. 3.

In one embodiment, the pipe member 12 (also referred to herein as a bar member) can be formed from heat treated steel to increase strength thereof. Also, or in the alternative, the pipe member 12 can have a uniform cross-section along an entirety of an axial length thereof. As best shown in FIGS. 1 and 5, the pipe member 12 is fully enclosed within the lower side and upper side stamped members 20, 22 to impart strength and structural integrity to the vehicle body structure 10.

The lower side stamped member or assembly 20 defines a step in the vehicle floor 24 of the vehicle frame 16 and the pipe member 12 is arranged adjacent to a corner 26 defined by the lower side stamped member or assembly 20. More particularly, the vehicle floor 24 can be defined by a forward floor section 28 and a rearward floor section 30 with the lower stamped member or assembly 20 interposed between the sections 28, 30. As shown in FIG. 5, the lower stamped member or assembly 20, and particularly the central stamping 20a, can include a first wall or flanged portion 20d defining a lower side of the lower stamped member or assembly 20 and a second wall or flanged portion 20e extending upward from one end (e.g., a rearward end) of the first flanged portion 20d to define a stepped profile on the floor 24 of the vehicle. The first flanged portion 20d is disposed on an underside of the pipe member 12 and the second flanged portion 20e is rearward of the pipe member 12. A third wall portion 20f can extend rearward from a distal upward end of the second flanged portion 20e. The upper stamped member or assembly 22 can include a first wall or flanged portion 22d defining a lower side of the upper stamped member or assembly 22, a second wall or flanged portion 22e extending upward from one end (e.g., a rearward end) of the first flanged portion 22d, and a third wall or flanged portion 22f extending rearward from a distal upward end of the second flanged portion 22e. The second flanged portion 22e is forward of the pipe member 12 and the third flanged portion 22f is disposed over the piper member 12.

The vehicle body structure 10 can further include at least one bulkhead (e.g., bulkheads 40, 42) supporting the pipe member 12 in spaced relation relative to the lower side stamped member or assembly 20. The at least one bulkhead can be arranged adjacent at least one of the first and second lateral sides 14, 18 of the vehicle frame 16. In the illustrated embodiment, the at least one bulkhead includes a first bulkhead arranged adjacent the first lateral side 14 of the vehicle frame 16 and a second bulkhead 42 arranged adjacent to the second lateral side 18 of the vehicle frame 16. The first and second bulkheads 40, 42 can generally be similarly constructed such that only the first bulkhead 40 will be further described herein. As shown, the first bulkhead 40 can include flanges 40a for securing the bulkhead 40 to the lower and upper side stamped members 20, 22. In particular, the first bulkhead 40 is secured to the lateral flanking stamping 20b. The first bulkhead 40 can define a cutout or aperture 40b in which the pipe member 12 is received. In particular, the first and second bulkheads 40, 42 are each arranged orthogonally relative to a lateral width of the vehicle on which the body structure 10 is provided. Each of the bulkheads 40, 42 supports the pipe member 12 in an elevated position relative to a lower side (e.g., first wall portion 20d) of the lower stamped member 20.

The vehicle body structure 10 can additionally include at least one stiffener (e.g., stiffeners 44, 46 and 48) disposed along a longitudinal length of the pipe member 12. The at least one stiffener can be secured to at least one of the lower and upper stamped members 20, 22. Also, the at least one stiffener is arranged along a longitudinal length of the pipe member 12 and arranged laterally between the first and second lateral sides 14, 18 of the vehicle frame 16.

In the illustrated embodiment, the at least one stiffener includes a central stiffener 44 overlaying the pipe member 12 and the lower side stamped member or assembly 20. The central stiffener 44 is laterally arranged between the first and second bulkheads 40, 42, including being spaced apart from the first and second bulkheads 40, 42, and further interposed in a direction of travel for the vehicle between the pipe member 12 and the upper side stamped member 22.

Additionally in the illustrated embodiment, the at least one stiffener includes laterally spaced apart stiffeners 46, 48 arranged between the lower side stamped member 20 and the pipe member 12 to secure the pipe member 12 to the lower side stamped member 20. Each of the laterally spaced apart stiffeners 46, 48 can include protruding tabs 50 arranged to position, support and secure the pipe member 12 relative to the laterally spaced apart stiffeners 46, 48. In one embodiment, the pipe member 12 is MIG welded to the laterally spaced apart stiffeners 46, 48 to axially load the pipe member 12 for side impact protection. As shown, the laterally spaced apart stiffeners 46, 48 can be spaced apart (and between) each of the central stiffener 44 and the bulkheads 40, 42. The laterally spaced apart stiffeners 46, 48 can each be fixedly secured to the lower stamped member 20, particularly to the central stamping 20a in the illustrated embodiment, by one or both of bolt fasteners (e.g., bolts 52) or welding. Likewise, the central stiffener 44 can be fixedly secured to the lower stamped member 20 by one or both of bolt fasteners (e.g., bolts 54) or welding.

Further, the at least one stiffener could include the lateral flanking stampings 20b, 20b of the lower stamped member or assembly 20. That is, the lateral flanking stampings 20b, 20c could function as stiffeners in the structure 10.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle body structure for absorbing side impacts on a vehicle, comprising:
a pipe member extending laterally from a first lateral side of a vehicle frame to a second lateral side of the vehicle frame;
a lower side stamped member disposed on an underside of the pipe member and rearward of the pipe member in a direction of travel for the vehicle, the lower side stamped member extending laterally from the first lateral side of the vehicle frame to the second lateral side of the vehicle frame;
an upper side stamped member forward of the lower side stamped member in the direction of travel of the vehicle, the upper side stamped member disposed over and forward of the pipe member to sandwich the pipe member between the lower side and upper side stamped members, the upper side stamped member extending laterally from the first lateral side of the vehicle frame to the second lateral side of the frame member; and at least one first stiffener arranged along a longitudinal length of the pipe member and arranged laterally between the first and second lateral sides of the vehicle frame, the at least one first stiffener further arranged between the lower side stamped member and the pipe member to secure the pipe member to the lower side stamped member.

2. The vehicle body structure of claim 1 wherein the pipe member is formed from heat treated steel.

3. The vehicle body structure of claim 1 wherein the pipe member has a uniform cross-section along an entirety of an axial length thereof.

4. The vehicle body structure of claim 1 wherein the pipe member is fully enclosed within the lower side and upper side stamped members.

5. The vehicle body structure of claim 1 wherein the lower side stamped member defines a step in a vehicle floor of the vehicle frame and the pipe member is arranged adjacent a corner defined by the lower side stamped member.

6. The vehicle body structure of claim 1 further including at least one bulkhead supporting the pipe member in spaced relation relative to the lower side stamped member, the at least one bulkhead arranged adjacent at least one of the first and second lateral sides of the vehicle frame.

7. The vehicle body structure of claim 6 wherein the at least one bulkhead includes a first bulkhead arranged adjacent the first lateral side of the vehicle frame and a second bulkhead arranged adjacent the second lateral side of the vehicle frame.

8. The vehicle body structure of claim 7 further including a central stiffener overlaying the pipe member and the lower side stamped member, the central stiffener laterally arranged between the first and second bulkheads and further interposed between the pipe member and the upper side stamped member.

9. The vehicle body structure of claim 1 further including a central stiffener overlaying the pipe member and the lower side stamped member, and further interposed between the pipe member and the upper side stamped member.

10. The vehicle body structure of claim 1 wherein the at least one first stiffener includes laterally spaced apart first stiffeners, each of the first stiffeners arranged between the lower side stamped member and the pipe member to secure the pipe member to the lower side stamped member.

11. The vehicle body structure of claim 10 wherein each of the first stiffeners include protruding tabs arranged to position the pipe member relative to the first stiffeners.

12. The vehicle body structure of claim 11 wherein the pipe member is mig welded to the first stiffeners to axially load the pipe member for side impact protection.

13. A body structure for absorbing side impacts on a vehicle, comprising:

a first stamped member extending across a lateral width of the vehicle;

a second stamped member extending laterally across the lateral width of the vehicle, the second stamped member fixedly secured to the first stamped member;

a bar member extending across the lateral width of the vehicle, the bar member interposed between the first and second stamped members so as to be enclosed by the first and second stamped members; and a first stiffener disposed along a longitudinal length of the bar member, the first stiffener overlaying the bar member and the first stamped member, and further interposed between the bar member and the second stamped member.

14. The body structure of claim 13 further including a pair of bulkheads each arranged orthogonally relative to the lateral width of the vehicle, each bulkhead supporting the bar member in an elevated position relative to a lower side of the first stamped member.

15. The body structure of claim 14 wherein the first stamped member includes a first flanged portion defining the lower side of the first stamped member and a second flanged portion extending upward from one end of the first flanged portion to define a stepped profile on a floor of the vehicle.

16. The body structure of claim 13 wherein the first stiffener is secured to at least one of the first or the second stamped members.

17. The body structure of claim 13 further including laterally spaced apart second stiffeners secured to at least one of the first or the second stamped members and having protruding tabs arranged to support the bar member.

18. The body structure of claim 13 wherein the bar member is a straight-walled structure having a uniform cross-section along an entirety of a longitudinal length thereof.

19. A vehicle body structure, comprising:

a pipe member extending laterally across a vehicle frame, the pipe member interposed between a pair of stamped members that each extend laterally across the vehicle frame, the pipe member mig welded to the stamped members to axially load the pipe member for side impact collisions.

* * * * *